US006971992B2

(12) United States Patent
Cerofolini

(10) Patent No.: US 6,971,992 B2
(45) Date of Patent: Dec. 6, 2005

(54) ULTRASONIC IMAGING METHOD AND APPARATUS

(75) Inventor: Marino Cerofolini, Subbiano (IT)

(73) Assignee: Esaote, S.p.A., Casale Monferrato (IT)

( * ) Notice: Subject to any disclaimer, the term of this patent is extended or adjusted under 35 U.S.C. 154(b) by 271 days.

(21) Appl. No.: 10/639,798

(22) Filed: Aug. 12, 2003

(65) Prior Publication Data

US 2004/0077945 A1 Apr. 22, 2004

(30) Foreign Application Priority Data

Aug. 13, 2002 (IT) .......................... SV2002A0040

(51) Int. Cl.[7] .................................................. A61B 8/00
(52) U.S. Cl. ...................................................... 600/447
(58) Field of Search ................................ 600/437–472; 73/625, 626; 128/916; 367/7, 11, 130, 138

(56) References Cited

U.S. PATENT DOCUMENTS 4,448,076 A * 5/1984 van Heelsbergen .......... 73/626
4,730,495 A 3/1988 Green
4,817,617 A * 4/1989 Takeuchi et al. ............ 600/441
5,129,399 A * 7/1992 Hirama ....................... 600/447

FOREIGN PATENT DOCUMENTS

EP 0916966 A 5/1999
WO WO 0235254 A 5/2002

* cited by examiner

*Primary Examiner*—Ali Imam
(74) *Attorney, Agent, or Firm*—Woodard, Emhardt, Moriarty, McNett & Henry LLP

(57) ABSTRACT

An ultrasonic imaging method and apparatus wherein the ultrasonic energy transmitted to a subject under examination is generated by a plurality of electroacoustic transducers, which are actuated for transmission with predetermined delays according to a predetermined focusing rule; the ultrasonic energy reflected by the subject under examination is received by an array of electroacoustic transducers which are actuated to read received signals with predetermined delays according to a received signal focusing rule. The focused received signals are turned into image data for ultrasonic image display. The transmitting transducers are actuated with such delays as to generate a homogeneous acoustic field over all or part of the region of the subject under examination.

22 Claims, 2 Drawing Sheets

ULTRASONIC IMAGING METHOD AND APPARATUS

The invention relates to an ultrasonic imaging method and apparatus, and in particular, to an ultrasonic imaging method and apparatus using multiple transducers.

CROSS-REFERENCE TO RELATED APPLICATION

The present application claims priority of Italian Patent Application Serial No. SV2002A000040 filed Aug. 13, 2002, which is hereby incorporated by reference in its entirety.

BACKGROUND

In prior art, ultrasonic probes have a plurality of electroacoustic transducers which are alternately actuated either for transmission or for reception. Imaging is performed, for instance, by scanning slice planes. In ultrasound imaging, a wavefront is transmitted to a subject and the reflected wavefront is detected. The reflected signals obviously contain information about the reflection centers or fronts. The information contained in the reflected wave may be extracted and processed to reconstruct images from reflected fronts. The amplitude variations of the reflected wave allow to assign different luminous intensities to image dots, whereas the position of the reflection point or front, i.e. the distance thereof from the ultrasound probe is determined on the basis of the time during which the ultrasound signal travels through the subject under examination. Therefore, by analyzing the time development of the reflected wave, the position of a reflection point or front may be uniquely related to a light intensity of an area of a display. In fact, the intensity to be displayed on the monitor depends on the amplitude of the reflected wave and its position depends on the time interval during which the reflected signals have that predetermined amplitude.

In prior art, each of the transducers of an ultrasound probe is actuated with a predetermined delay with respect to the others, these delays being determined thanks to a so-called focusing rule, which accounts for the fact that, in order to focus a beam of ultrasonic waves generated by transducers, e.g. on a point or a line, the distance from this point or line will be different for each transducer of the array.

Similarly, reflection signal read delays shall be imparted, as the contributions in the waves reflected by a point or a line of the subject under examination, that are detected by the individual transducers of a probe, will reach the transducers at different instants of time.

Hence, for instance, in 2D imaging, i.e. along a slice plane of the subject under examination, imaging is performed by a line-by-line scan of said plane, which is executed in such a manner that the adjacent scan line extend and subtend said slice plane.

The process is not different, but only extended to an additional dimension, in 3D imaging, wherein 3D images are typically composed of multiple slice planes.

To this end, ultrasonic imaging apparatuses are equipped with beamformers, which are used to define actuating and reading patterns for transmitted and received signals respectively.

There is currently the need of increasing the scanning velocity while keeping the quality of received signals, hence of images, unaltered. These two conditions are in contrast with each other.

In order to increase velocity and keep image quality unchanged, the arrangement of defocusing the transmitted beam was proposed. This allows to expand the region of the subject under examination through which the beam travels. However, focusing is maintained for reception. The proposed methods require a long processing time and complex hardware.

Furthermore, prior art ultrasonic imaging techniques use the fundamental frequency of transmitted and received signals. The above mentioned defocusing process, as well as the use of the fundamental transmission frequency component of the received signal, cause the secondary lobes to strongly affect the received signals and to prevent the attainment of a sufficient image quality.

Current transmitted beam defocusing techniques do not allow to reach sufficient image definition and resolution levels.

In prior art, ultrasonic imaging techniques are known wherein, upon transmission, ultrasonic waves are transmitted at a predetermined fundamental frequency, whereas, upon reception, only the harmonic component of the received signal is detected and processed for imaging, and particularly the component at the second harmonic of the fundamental transmission frequency.

These imaging techniques, so-called "Harmonic imaging" were developed for the purpose of displaying poorly echogenic structures, i.e. those structures that behave like bad reflectors in combination with contrast agents and have a frequency response centered on said second harmonic, or those structures that have a non linear reflection behavior, and which have the highest or relevant reflection coefficient at harmonic frequencies of the fundamental transmission frequency, particularly at the second harmonic of the fundamental frequency of the transmitted signal or wave.

Further, ultrasonic imaging with second generation contrast agents, is based on the extraction of non linear components of contrast agents, that are present even at low acoustic pressures. This allows to prevent ultrasonic waves from destroying contrast agents. At these low pressures, the non linear behavior of tissues is considerably reduced. Current problems are the sensitivity limit caused by the use of low mechanical pressures (aimed at not breaking contrast agents) and tissue residual components due to the incomplete removal of non linearities of the ultrasonic imaging system, especially upon transmission.

Several techniques are known to remove harmonic components, especially at second harmonic frequencies, from the transmitted signal. These techniques include adaptive filtering, double transmission of mutually subtracted pulses or transmission of a pulse and later of the inverted pulse, and combination of the reflected waves generated by said two pulses by subtraction or other similar methods, the so-called "Pulse Inversion" method, which is described, for instance, in U.S. Pat. No. 5,706,819.

In order to improve the signal-to-noise ratio, it is further known to perform several scans on the same line and to determine the mean of the signals received on the same line, at each transmission and reception cycle along said line.

Examples of various solutions to the above problems include, for example, the method and apparatus as described in U.S. Pat. Nos. 6,104,670, 5,724,976 or 5,628,320 or 5,620,708. All the methods and apparatuses described therein are relatively complex, and cause ultrasonic imaging apparatuses to be complex and expensive.

The invention has the object of providing an ultrasonic imaging method which, thanks to simple and inexpensive means, allows to obviate the drawbacks of known methods, and to overcome the limitations thereof and improving image quality, particularly in second harmonic ultrasonic imaging, while keeping the frame rate unaltered and allowing to determine the mean of a predetermined number of scan values along the same scan line, thereby increasing the signal-to-noise ratio.

Also, the invention has the object of providing this method in such a manner that the implementation thereof is not excessively burdensome as regards both the cost of the component units and the complexity of the ultrasonic imaging apparatus.

The invention achieves the above purposes by providing an ultrasound imaging method as described above, in which:

transmitting transducers are actuated with such delays as to generate a homogeneous acoustic field over all or at least a portion of the region of the subject under examination, which may be covered by the geometry of the whole array of transducers;

the ultrasonic energy is transmitted by two subgroups of transmitting electroacoustic transducers, the transducers of a first subgroup being actuated for transmission of ultrasonic energy with a predetermined waveform, and the transducers of the second subgroup being actuated for transmission of ultrasonic energy with an inverted waveform and with a half-period increase of the waveform.

When several successive ultrasonic energy transmission and reception cycles are provided, each subgroup of transducers is actuated for transmission of ultrasonic energy with the waveform that was transmitted, in the previous cycle, by the other group of transducers.

According to a further feature the receiving transducers are actuated simultaneously and the receive signals are stored for the whole duration thereof, while the received signal contributions from individual transducer, which correspond to reception time delays according to a predetermined rule for focusing said parts of the received signals on one or more points along a line or on a region of the subject under examination, are read and combined, particularly summed.

The word "homogeneous", as used in this disclosure and in the following claims, relates to a beam of ultrasonic energy which is substantially evenly focused over all or part of the region that can be covered by the geometry of the array of transmitting transducers, i.e. by the ultrasonic probe.

Several types of probes exist, which have different transducer arrangement geometries. In the so-called linear probes, transducers are arranged along a straight line, with their active, ultrasonic signal transmitting surfaces aligned on a flat surface. The transducers of the so-called convex probes have their active, ultrasonic signal transmitting surfaces arranged along a curved or arched surface.

In the implementation of the above method, the invention provides that transmitting transducers are imparted null actuation delays, to provide simultaneous actuation of all transmitting transducers to generate a beam of homogeneous ultrasonic energy over the whole region of the body under examination, that can be covered by the whole transducer array. Due to the fact that an array of transmitting transducers generates a wave that propagates along a scan plane or slice of the body under examination and provides image information about a scan plane or slice of the body under examination, which is considered as consisting of individual scan lines, simultaneous actuation of all transmitting transducers causes a simultaneous scan of all possible scan lines along said scan plane or slice.

Hence, a single transmission step can cover the whole region that can be examined by the array of transducers, unlike prior art methods which can cover said whole region by focusing the transmitted beam on individual adjacent scan lines, and hence require successive transmission of a number of beams that is at least equal to a number of scan lines, each successive beam being focused on a successive adjacent scan line, by imparting delays for actuating the individual transmitting transducers. In this invention, focusing is only executed for reception by using a mode that is different with respect to the conventional reception focusing mode of prior art ultrasonic imaging methods.

As an alternative to the above, the invention may provide the use of such delays to transmitting transducers, as they are determined for the purpose of focusing the transmitted beam with a transmission step which uses a number of scan lines that is smaller than the maximum allowed number and greater than one. In practice, the region that is hit by the transmitted ultrasound beam at each transmission step is only a portion of the whole region that may be covered by the whole array of transducers in the mode in which the latter are actuated simultaneously. With reference to the above example of the scan plane or slice, each transmission step provides that such delays are imparted to the individual transmitting transducers to generate beams for scanning a portion of the scan plane or slice. This allows to reduce the number of transmission steps as compared with conventional scanning, which involves line-by-line focusing to obtain a better definition as compared with the mode that provides simultaneous actuation of transmitting transducers, i.e. an ultrasound beam that covers the whole scan plane or slice of the body under examination.

The transmitting transducer actuation delays aimed at generating an energy beam focused on a predetermined part of the region of the body under examination that may be covered, i.e. examined, by the signal transmitted by the whole array of transducers, i.e. at focusing said beam on at least some of the scan lines that may be generated by the transmitting transducers, may be set as desired and progressively from a zero value, corresponding to simultaneous actuation and a value corresponding to focusing on a single scan line, in such a manner as to be able to decide the desired number of scan lines whereon the transmitted beam is to be focused according to image quality requirements or to the details to be displayed, which are better visible by increasing definition or by increasing imaging velocity. Obviously, when the ultrasonic energy beam is only partly focused as described above, the whole scan plane or the whole scan slice of the body under examination is scanned by executing several successive transmission steps that are partly focused, every time, on adjacent partial regions of the whole scan plane or slice that can be covered by an array of transmitting transducers.

The methods for determining delays are well-known and widely used in the so-called transmitting and receiving beamformers. The delays are determined on the basis of the velocity of ultrasonic wave propagation in the subject under examination and of the relative distance between a desired focusing point, line or region and the individual transducers.

Furthermore thanks to the fact that the ultrasonic energy is transmitted by two subgroups of transmitting electroacoustic transducers, the transducers of a first subgroup being actuated for transmission of ultrasonic energy with a predetermined waveform, and the transducers of the second subgroup being actuated for transmission of ultrasonic energy with an inverted waveform and with a half-period increase of the waveform a transmit beam is properly formed for the fundamental energy or ultrasound wave transmission frequency, and for all odd harmonics, whereas the above steps remove the even harmonics of the transmitted wave or ultrasonic energy. The transmission wave type exchange between the two subgroups for each successive transmission cycle allows to obviate depolarization for the transducers subjected to the transmission of inverted transmission wave.

So the image acquisition is very fast, as the signals of the two subgroups when combined allow fast filtering of the signal for isolating the signal at the harmonic frequency.

As a rule, transmitting transducers and receiving transducers are the same transducers that are alternately actuated for transmission and reception of ultrasonic pulses, but different transducers may be provided for the two purposes.

In combination with an array of transducers, in which transducers are arranged side-by-side and/or aligned along a straight plane, either on a line or in the form of a 2D matrix, the use of zero delays, i.e. the simultaneous actuation of all transmitting transducers generates a homogeneous beam composed of the ultrasonic signal contributions of each transmitting transducer.

However, in combination with an array of transducers arranged either on a single line or on a 2D matrix along a curved surface, as in convex probes, simultaneous actuation generates a divergent beam. In this case, in order to obtain a homogeneous ultrasonic energy beam, according to the above definition of the word "homogeneous", transducer actuation delays must be imparted to correct the divergence of the beam and evenly focus the examinable region.

Particularly for convex probes, but in extreme cases even for linear probes, the limitation of the ultrasound beam to a portion of the region that may be examined by the whole array of transmitting transducers, i.e. only to a few scan lines, allows to obviate a few drawbacks associated to the need of imparting too long delays to the transmitting transducers that are arranged in such positions as to form a very wide angle of incidence on the examined region.

BRIEF SUMMARY OF THE INVENTION

In accordance with a variant embodiment of the invention, which is suggested by the above description, instead of actuating transmitting transducers with such delays as to generate a homogeneous ultrasound beam in the form of a parallel beam, it is possible to actuate transmitting transducers with such delays as to generate a divergent beam, so as to widen the field of view of the transducer array. Here, this is obtained by using an array of transducers in which transmitting transducers are arranged along a curved surface, which transducers are actuated simultaneously or by imparting certain delays to the transmitting transducers of a transducer array having transducers arranged over a flat surface.

According to a further improvement, the received signal of each transducer is sampled by analog-to-digital conversion and stored in a memory by using, as a storage address, the subject penetration depth, i.e. the instant or interval in which the corresponding part of the signal is received.

In order to extract image data from received signals, the latter are read by the memory by using an address corresponding to the subject penetration depth, i.e. the instant or interval wherein the corresponding part of the received signal, minus the delay that may be imparted to the corresponding transducer to focus said part of the signal on one or more predetermined points on one or more predetermined lines or on a predetermined region of the subject under examination.

In combination with the execution of successive ultrasonic energy transmission cycles, the received signal for each ultrasonic energy transmission, detected by each electroacoustic transducer, is stored in the same memory and by using the same rule for determining the read addresses for each successive received signal, whereas the memory determines the mean of all the parts of the successive received signals having the same write address.

Total defocusing for transmission and second harmonic focusing for signal reception according to the method of this invention, allow all ultrasonic energy transmission energy to be averaged.

This provides an additional advantage with respect to conventional averaging methods, wherein imaging is performed by successively focusing transmit beams on a point, a line or a limited region of the subject under examination. Here the mean of a predetermined number of scans along the same line requires the ultrasonic energy, focused on said point, line or limited region, to be transmitted for a number of times corresponding to the predetermined number of scans to be averaged. The method of the invention provides useful data for averaging all lines for each transmission cycle. Considering a scan with n lines, in order to obtain the mean of m detection samples along the same line, the method of the invention allows to only execute m transmission and reception cycles, whereas the conventional method requires the execution of m scans, i.e. m ultrasonic wave transmission and reception cycles, for each of the n scan lines.

Moreover, if the second harmonic component of the received signals is used, the poor image definition or resolution problems are obviated, as the effects of side lobes of reflected waves of each element on adjacent elements are considerably lower or insignificant.

The invention also pertains to an ultrasonic imaging system for implementing the above inventive method.

The apparatus includes:

a) a plurality of electroacoustic transducers for transmitting ultrasonic energy, each being connected, through a transmitted beam focusing unit, the so called "transmitting beamformer", to a generator of signals to be transmitted, with predetermined waveform and frequency.

b) a plurality of electroacoustic receiving transducers, each being connected, through a focusing unit, the so-called "receiving beamformer", to an image processing and generating circuit;

c) for each receiving transducer, separate means for analog-to-digital conversion of the received signals upstream from the receiving focuser means, which sample the reception signal in the time domain.

According to the invention, the transmitted beam focusing means are programmed in such a manner as to impart such transmission delays as to generate a homogeneous acoustic field, whereas a memory is provided between the received beam focusing means and the analog-to-digital converter of each receiving transducer, which memory is associated to means for determining the write address of the sampled parts of the received signal as a function of depth, i.e. the instant or interval in which the individual parts of the sampled received signal are detected, with reference to the time development of the received signal, whereas means are provided to allow the received beam focusing means to determine the memory read address, as the depth of the part of the sampled received signal minus the delay corresponding to said part of the signal, as determined by the received beam focusing means, on the basis of the point, line or limited region to be imaged.

As is apparent, the apparatus of the invention requires no considerable change to the hardware of conventional ultrasonic imaging apparatuses, excepting the provision of a memory for each receiving channel and means for determining write and read addresses. Nevertheless, it shall be noted that, as each address corresponds to the depth of that sampled part of the received signal, the means for determining the write address simply consist of depth meters. Also, these means automatically provide a part that is necessary for determining the read address of the memory, the other part thereof being provided, like in existing apparatuses, by the received beam focusing means, which impart the delays required for focusing received signals on a predetermined point, line or limited region of the subject under examination.

As far as construction is concerned, the method and the apparatus of the invention only require small construction changes which do not involve a higher complexity of the apparatus, and do not require high implementation costs.

It shall be further noted that, due to the above considerations, the method of the invention may be rather easily implemented in existing apparatuses and does not restrict or prevent the possibility of using, as an alternative to the inventive method, well-known and conventional ultrasonic imaging methods, which also provide higher or lower transmit beam focusing.

Further improvements and advantages of the inventive method will form the subject of the subclaims.

The characteristics of the invention and the advantages derived therefrom will appear more clearly from the following description of a non limiting embodiment, illustrated in the annexed drawings, in which:

DETAILED DESCRIPTION OF THE PREFERRED EMBODIMENTS

Figure 1:
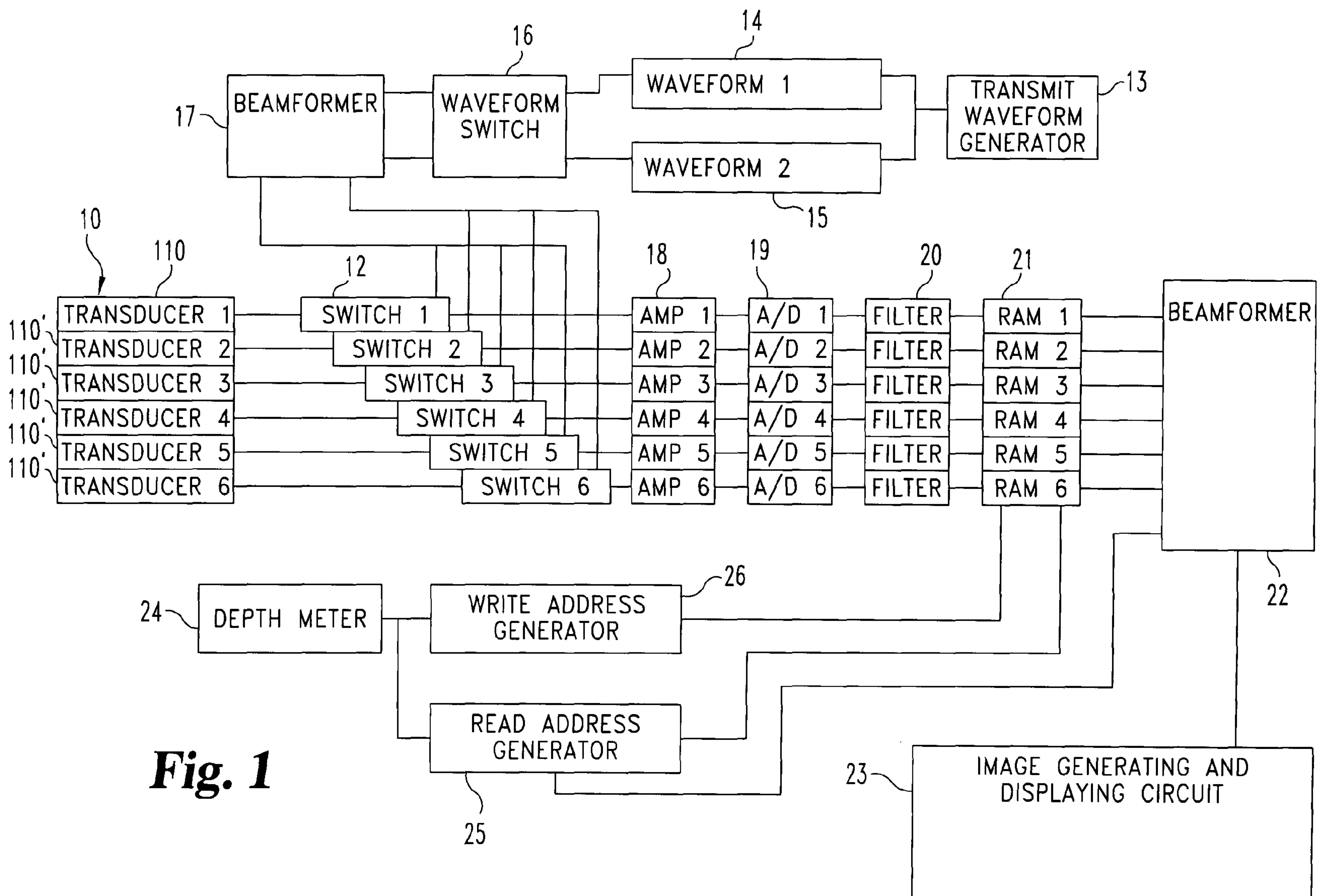
FIG. 1 is a block diagram of an apparatus according to the invention in which the part for ultrasonic wave transmission and reception is shown in detail, for better clearness, and the part for further processing of received signals into image data and displayed images is shown as a single block, as the latter is or may be made in a well-known manner according to any prior art technology.

Referring to FIG. 1, an ultrasonic imaging apparatus includes a probe 10 composed of a plurality of transducers 110. For the sake of simplicity, the figure only shows six electroacoustic transducers, forming a linear array. Nevertheless, it shall be noted that the invention is not limited to the linear array probe, but may be also applied to other types of probes.

The individual transducers 110 are diversified by numbering them from 1 to 6. Typically, linear array probes have 64 to 256 electroacoustic transducers, acting as transmitting and receiving transducers. Each transducer is connected to a switch 12 which alternately connect them to an ultrasonic wave generating signal supply and to the receiving circuit.

The transducer transmission actuating signal is provided by a generator 13 which supplies two waveformers 14 and 15. The signal consists of a pulse having a predetermined duration and a predetermined frequency, which will cause the generation of an ultrasonic pulse or wave having a substantially identical curve of waveform and substantially the same duration. The desired and optimal waveform consists of a Gaussian curve with a predetermined frequency, having no harmonic contributions. However, as the pulse has a limited duration, this limit unavoidably introduces undesired harmonic contributions. In prior art, a certain number of arrangements are known and used to limit the presence or contribution of harmonics of the fundamental frequency from the transmitted wave pulse. This invention uses a particular method, which consists in providing a second waveformer 15, for generating a pulse that is the inverse of that of the first waveformer, and shifted one half period out of phase from the waveform provided by the first waveformer 14. Thanks to the switch 16, the two signals for exciting the transducers 110, 110' are separately provided to two subgroups of the transducers to be excited for transmission. The transducers of a first subgroup are designated as 110 and those of the second subgroup are designated as 110'.

A beamformer 17 provides the excitation signals to the two subgroups with predetermined delays, that are determined according to a focusing rule applicable to the beam of the ultrasonic waves transmitted by the individual transmitting transducers. The focusing rule and the delays are determined by the beamformer according to user-customized focusing selections or to a particular operating mode of the apparatus.

As is well known in the field of ultrasonic imaging, the focusing rule depends and may be determined on the basis of the time of propagation of ultrasonic waves in the subject under examination and of the distance of the individual transducers from the point, line or limited region whereon the beam is to be focused.

The above transmission mode, wherein the transducers 10 in even positions transmit a predetermined waveform and the transducers 110' in odd positions transmit an inverse wave, shifted one half period out of phase from that transmitted by the transducers in even positions is such that, in the beam obtained from the combination of ultrasonic waves transmitted by the individual transducers, the fundamental frequency and the odd harmonics are maintained, and the even harmonics, and especially components of the beam emitted at the second harmonic of the fundamental frequency are suppressed (removed). This is particularly advantageous when the image is reconstructed from the information contained in received signal components at the second harmonic of the fundamental frequency of the transmitted pulse or beam.

As is apparent from the annexed diagram, described above, the waveform switch 16 allows to exchange the transmission waveforms of the two sub-groups of transducers 110, 110' for each successive ultrasound beam transmission cycle. In fact, ultrasonic imaging is typically performed over a slice plane of the subject under examination, or a volume thereof, whereby a line-by-line scan is executed. In order to obtain the image of a slice plane, several adjacent lines, contained in the desired slice plane, are scanned. Also, the above described transmission cycle may be repeated in order to average the signals received along a single line in several transmission cycles.

The transmission waveform exchange between the two subgroups of transducers 110, 110' advantageously allows to prevent depolarization especially for ceramic, inverted pulse transducers.

In this invention, the beamformer is set in such a manner that any ultrasonic wave transmission delay imparted to the transducers 110, 110' allows to generate a homogeneous ultrasound field. This is generally obtained by simultaneously exciting all transducers for transmission. Here the transmitted ultrasound beam is completely defocused, and a flat wave or an arched wave is generated along the scan plane, depending on whether the transducers 110, 110' have a flat linear alignment or an arched linear alignment respectively, i.e. whether the transducers 110, 110' are disposed on adjacent positions along a straight line or along an arched line, whose curvature is oriented toward the ultrasound beam transmission direction.

The defocused beam allows to cover, by its ultrasonic energy, a band whose width substantially corresponds to that of the array of transducers 110, 110'.

The transmission cycle is followed by a reception cycle. The switches 12 connect the transducers to the channels along which the electric signals generated by the ultrasonic acoustic waves, reflected against the transducers and picked up or detected thereby, are received.

After a preamplification 18 and possibly a TGC step, like in conventional ultrasonic imaging apparatuses, the signals received by each transducer 110, 110' are subjected to analog-to-digital conversion 19, and later filtered 20 and stored in a RAM 21, wherefrom they are read by the received beam focuser 22 according to predetermined focusing rules to be applied to points, line or limited regions of the subject under examination. The signal of the beam reconstructed by the received beam former 22 is then forwarded to the further, well-known image data generating and displaying chain 23.

Figure 2:
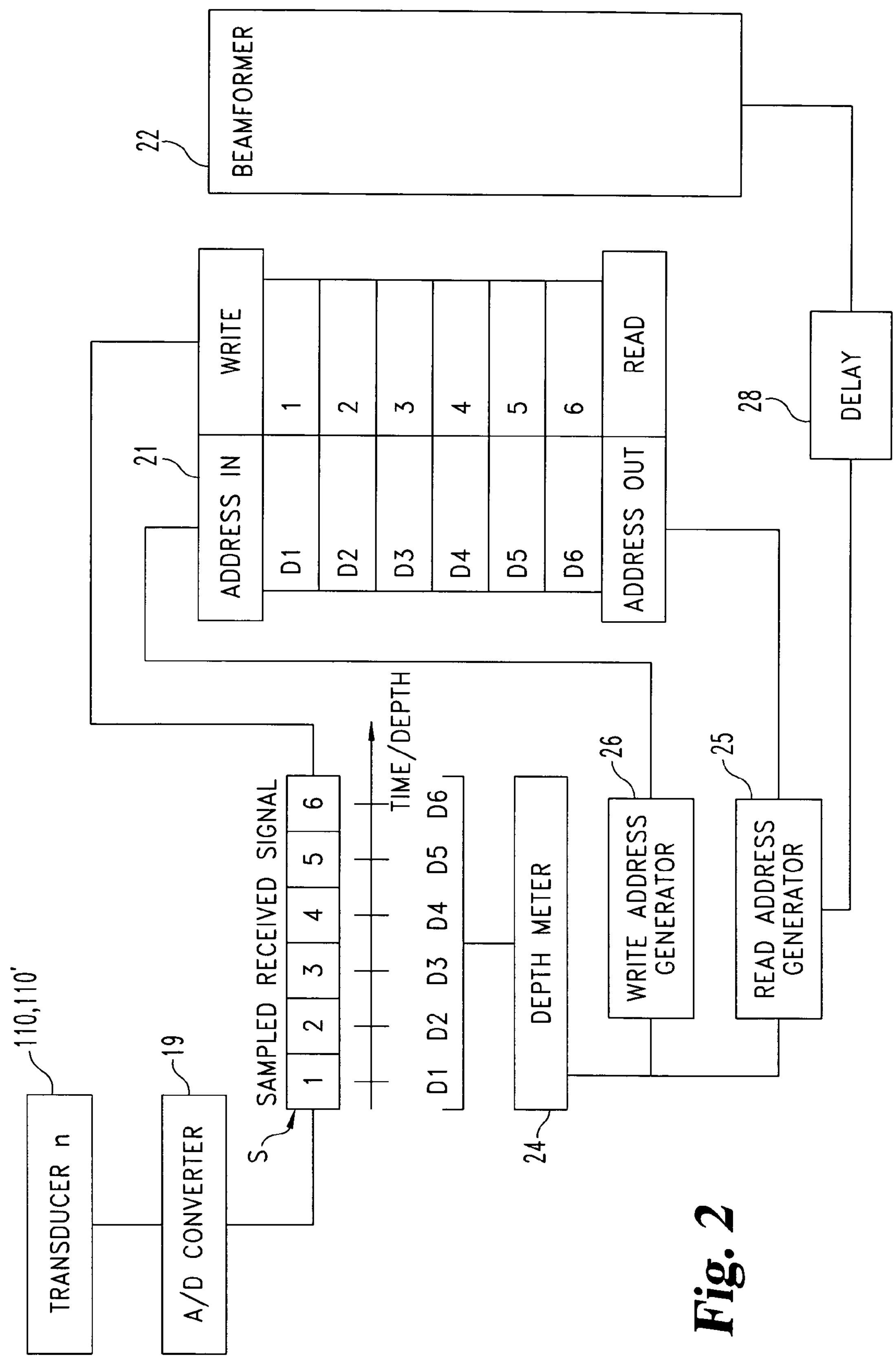
FIG. 2 is a detailed functional block diagram which shows the received signal processing modes in one of the n possible transducers.

This invention provides a particular mode for storing received signals and a particular mode for reading them, which is shown in the block diagram of FIG. 2.

FIG. 2 only shows the channel for one transducer 110, 110', the reception and storage channels for the other transducers 110, 110' being all identical.

The analog received signal is converted to digital form in the time domain. Thereafter, the signal consists of discrete pairs of values, in which one value corresponds to a signal amplitude value and the other corresponds to the instant in the time development of the signal in which this amplitude value is present. The instant is defined as the time from the start of the reception cycle to the moment in which the amplitude value of the received signal has reached the transducer and has been detected and turned into a corresponding electric signal.

Considering that the propagation velocity of ultrasounds in the subject under examination may be held as constant, the time from the start of the reception cycle and the moment in which a particular part of the signal, with reference to its time development, is received, corresponds to a predetermined distance of the transducer from the point in which the transmitted ultrasonic wave is reflected, hence to a predetermined propagation depth of the ultrasonic wave in the subject under examination.

Thanks to this consideration, all focusing rules for ultrasonic waves transmitted to the subject under examination, as well as the delays to be imparted to the actuation and reading of transducers 110, 110' according to the selected focusing rule, may be determined a priori. The focusing rule will vary depending on where and how the received beam is to be focused.

Starting from a completely defocused transmit beam, the reflected beams detected by the transducers of the reception cycle will contain information for all scan lines, at all depths. In this case, in order to focus the received beam, the signals received by each transducer 110, 110' are stored in such a manner as to allow them to be easily read to generate a focused reception beam.

Particularly, signals are stored by uniquely associating the parts thereof, with reference to their time development, and the instant or interval in which these signal parts have reached the transducer.

FIG. 2 shows this process in a very schematized form, to facilitate the understanding of the guiding principle.

Analog-to-digital conversion requires the received signal to be sampled over time. This means that the amplitudes of received signals are measured at certain time intervals, and uniquely associated thereto. This is clearly shown in FIG. 2 by the division of the signal S into cells, that are numbered from 1 to 6. Each cell relates to an amplitude, the time axis being represented below the sampled signal identifying cells, with instants D1 to D6. These instants are uniquely related to the depth wherefrom the corresponding signal part derives.

The transducer RAM 21 uses, as a write address, the corresponding penetration depth value, or the value of distance between the reflection point or front from the transducer 110. A write address generator 26 generates the write address depending on said penetration depth, which is provided by a depth meter 24. The RAM 21, as represented in the figure, shows that the components of the received signal are allocated therein so as to be uniquely related to the penetration depth, i.e. to the distance of the reflection point from the transducers. When the received beam is to be focused on a specific line, the memory of each transducer must be read in such a manner that the beam focuser 22 may extract from the RAM 21 associated to each transducer the signal part that corresponds to the contribution of the received signal which is focused on a point, a line or a limited region. In this case, the focuser reads the RAM 21 by using a read address which is determined according to the penetration depth and to the delay to be imparted to said transducer for transmission to allow the transmit beam to be focused on the corresponding reflection point or front.

Particularly, the read address generator 25 determines this address as the penetration depth, uniquely related to a part of the received signal minus the delay determined with the selected focusing rule.

The above description clearly shows that, if received signals are to be focused along a scan line, the focusing rule will be the conventional rule for focusing ultrasonic waves along a scan line, whereas the memory areas corresponding to this received wave, focused on the scan line, will be extracted and read from the received signals of all transducers.

When the ultrasonic wave transmission and reception cycles are repeated, thanks to the full defocusing of the transmit beam, the received signals of all transducers will all contain a contribution or a part of the signal relative to focusing of the transducers on a predetermined point or line or limited region of the subject under examination. Hence, the RAM is such as to allow to determine, for each transducer and at each transmission cycle, a mean of all the contributions of received signals, having the same write address. This step may be performed by appropriately programming the memory or in a separate unit.

As described above, by defocusing the transmitted wave beam, the advantage is obtained that, for each transmission cycle, all the received signals are collected, containing all the reflection contributions for all possible points, lines or limited lines of the subject under examination, which are to be focused upon reception to reconstruct the image to be displayed. This involves a considerable reduction of transmission/reception cycle repetitions as compared to those required when using an ultrasonic wave beam that is also focused for transmission. Therefore, while reducing the scan time as compared with prior art, the same results may be obtained in terms of signal-to-noise ratio. However, if the same number of transmission/reception cycle repetitions as in prior art is used, the signal-to-noise ratio may be further considerably improved, while keeping the same scan process duration.

As mentioned above, the apparatus and the method of the invention are adapted to be also applied to existing ultrasonic imaging apparatuses, a few, inexpensive minor changes being required thereby. Moreover, the features of the invention do not affect in any manner the alternative operation of the apparatus according to conventional ultrasonic imaging techniques. Therefore, said method may be also provided in combination with a limited defocusing process, instead of full defocusing of the transmitted wave beam. Defocusing may be pushed to such levels as to reach higher results than generating a homogeneous ultrasonic energy beam, in the form of a parallel beam that covers the whole region of the body under examination that can be illuminated by the array of transmitting transducers. In fact, by imparting defocusing delays to the transducers that transmit the ultrasonic energy beam, more or less divergent beams may be generated. The use of a linear array of transducers, i.e. a set of transducers disposed along a straight surface provides the same defocused transmit beam as would be obtained by using a simultaneously actuated array of transducers, arranged along the arched surface. Conversely, the use of an array of transducers arranged along an arched surface might provide homogeneous energy beams like those generated by simultaneously actuating an array of transducers arranged over a flat surface.

Furthermore, the method is not limited to harmonic imaging processes. In fact, excepting the second harmonic suppression arrangement, the method may be also used for any imaging mode, e.g. the traditional B-mode or other well-known methods. However, according to this invention, the method and apparatus is particularly suitable to be used for ultrasonic imaging on the basis of harmonic components of reception signals.

Obviously, the invention is not limited to the above description and figures, but may be greatly varied, and particularly the apparatus may be varied as regards construction, and the method may be varied by combination with other well-known imaging methods. All the above without departure from the inventive teaching disclosed above and claimed below.

I claim:

1. An ultrasonic imaging method including the following steps:

a) transmitting ultrasonic energy to a subject under examination, said ultrasonic energy being generated by a plurality of electroacoustic transducers which are actuated for transmission with predetermined delays according to a predetermined ultrasonic energy focusing rule;

b) receiving the ultrasonic energy reflected by the subject under examination by means of an array of electroacoustic transducers, the receiving transducers being actuated, or the received signals detected thereby being read with predetermined delays according to a received signal focusing rule;

c) turning said received signals into image data adapted to reconstruct the transmitted energy reflection points, which generated the energy reflected and detected by the electroacoustic transducers as a displayable image;

d) actuating said transmitting transducers with such delays as to generate a homogeneous acoustic field over all or at least a portion of the region of the subject under examination, which may be covered by the geometry of the whole array of transducers; and e) transmitting said ultrasonic energy by two subgroups of transmitting electroacoustic transducers, the transducers of a first subgroup being actuated for transmission of ultrasonic energy with a predetermined waveform, and the transducers of the second subgroup being actuated for transmission of ultrasonic energy with an inverted waveform and with a half-period increase of the waveform.

2. An ultrasonic imaging method according to claim 1 including the step of:

actuating said receiving transducers simultaneously and storing said received signals for the whole duration while the received signal contributions from individual transducers, which correspond to reception time delays according to a predetermined rule for focusing said parts of the received signals on one or more points along a line or on a region of the subject under examination, are read and combined.

3. A method as claimed in claim 1, characterized in that said transmitting transducers are actuated with null actuation delays, so as to cause simultaneous actuation of all transmitting transducers.

4. A method as claimed in claim 1, characterized in that said transmitting transducers are actuated with such actuation delays as to generate an ultrasonic energy beam that is focused on a predetermined portion of the region of the subject under examination, which corresponds to at least some of the scan lines that may be generated by using an array of transmitting transducers.

5. A method as claimed in claim 1, characterized in that said transmitting transducers and said receiving transducers are the same transducers that are alternately actuated for transmission and reception of ultrasonic pulses.

6. A method as claimed in claim 1, characterized in that the delays imparted to the individual electroacoustic transducers for reception and/or reading of received signals are determined on the basis of the velocity of ultrasonic wavefront propagation in the subject under examination, and of the distance of the points, line or region of the subject under examination to be imaged from the corresponding electroacoustic transducer.

7. A method as claimed in claim 1, characterized in that multiple successive ultrasonic energy transmission and reception cycles are provided.

8. A method as claimed in claim 7, characterized in that in each successive transmission cycle, each subgroup of transducers is actuated for transmission of ultrasonic energy with the waveform that was transmitted, in the previous cycle, by the other group of transducers.

9. A method as claimed in claim 1, characterized in that the transducers of the two subgroups are arranged in alternate positions in the transducer array.

10. A method as claimed in claim 9, characterized in that, in a one-line arrangement of electroacoustic transducers, the first group is composed of transducers in even positions, and the second group is composed of transducers in odd positions.

11. A method as claimed in claim 1, characterized in that the received signal of each transducer is sampled by analog-to-digital conversion and stored in a memory by using, as a storage address, the subject penetration depth.

12. A method as claimed in claim 1, characterized in that received signals are stored in memory by using addresses corresponding to the subject penetration depth, minus the delay that may be imparted to the corresponding transducer to focus said part of the signal on one or more predetermined points, on one or more predetermined lines or on a predetermined region of the subject under examination.

13. A method as claimed in claim 1, combined with the execution of successive ultrasonic transmission cycles, characterized in that the received signal for each ultrasonic energy transmission is detected by each electroacoustic transducer and stored in the same memory and by using the same rule for determining the read addresses for each successive received signal, whereas the memory determines the mean of all the parts of the successive received signals having the same write address.

14. A method as claimed in claim 1, characterized in that the focusing rule applied to determine the delays for calculating the memory read addresses is the same as the rule for executing a scan by adjacent scan line of a slice plane of the subject under examination.

15. A method as claimed in claim 1, characterized in that, instead of actuating the transmitting transducers with such delays as to generate a homogeneous ultrasound beam, the transmitting transducers are actuated with such transmission delays as to generate a divergent ultrasonic energy beam.

16. A method as claimed in claim 1, characterized in that, in combination with a transducer array, in which transducers are arranged over a curved surface, such transmission delays are imparted as to generate a homogeneous ultrasonic wave beam, or the transmitting transducers are actuated simultaneously and selectively with defocusing delays aimed at forming a divergent beam.

17. An ultrasonic imaging apparatus comprising:

a) a plurality of electroacoustic transducers for transmitting ultrasonic energy, each being connected through a transmitted beam focusing unit to a generator of signals to be transmitted with predetermined waveform and frequency;

b) a plurality of electroacoustic receiving transducers, each being connected through a focusing unit to an image processing and generating circuit;

c) means associated with each receiving transducer for analog-to-digital conversion of the received signals upstream from the receiving focuser means which samples the reception signal in the time domain; and d) beam focusing means programmed in such a manner as to impart such delays for actuation of the electroacoustic energy transmitting transducers to generate a homogeneous acoustic field, whereas a memory is provided between the received beam focusing means and the analog-to-digital converter of each receiving transducer, which memory is associated to means for determining the write address of the sampled parts of the received signal as a function of depth with reference to the time development of the received signal, whereas means are provided to allow the received beam focusing means to determine the read address of the memory as the depth of the part of the sampled received signal minus the delay corresponding to said part of the signal, as determined by the received beam focusing means on the basis of the point, line or limited region to be imaged.

18. An apparatus as claimed in claim 17, further comprising means for repeating the transmission and reception cycle a predetermined number of times and means for determining the mean of the received signals for each receiving transducer, said determining means being connected to the memory associated to each transducer, such that the mean of individual receiving signals being determined for each component corresponding to the same address.

19. An apparatus as claimed in claim 17, characterized in that the transmitting transducers and the receiving transducers are the same transducers that are alternately actuated for transmission and reception of ultrasonic pulses.

20. An apparatus as claimed in claim 17, characterized in that the plurality of transducers is divided into two subgroups which are alternately connected through a switch, said first subgroup being connected to a first generator of a predetermined waveform, and said second subgroup being connected to a second generator of a second waveform, which second waveform corresponds to an excitation signal which is the inverse of that provided by said first generator but is one half period out of phase from the waveform.

21. An apparatus as claimed in claim 20, characterized in that said switch elements are controlled in such a manner as to switch the connection of the two subgroups of transducers from the one to the other of said two waveform generators at each transmission cycle.

22. An apparatus as claimed in claim 17, characterized in that each receiving transducer is connected to a filter for suppressing the received signal component at the fundamental frequency of the transmitted signal.

* * * * *